June 4, 1963

D. VAN UTT ETAL 3,092,743

A.C. MOTOR

Filed Dec. 17, 1959

INVENTORS.
DAMON VAN UTT
HOWARD J. SAMPSON

BY

*Davis, Hoxie, Faithfull & Hapgood*
ATTORNEYS.

United States Patent Office 3,092,743
Patented June 4, 1963

3,092,743
A.C. MOTOR
Damon Van Utt, Essex, and Howard J. Sampson, Deep River, Conn., assignors, by mesne assignments, to Giannini Controls Corporation, Duarte, Calif., a corporation of New York
Filed Dec. 17, 1959, Ser. No. 860,196
7 Claims. (Cl. 310—162)

This invention relates to miniature electrical motors and more particularly to miniature alternating current motors, such as those used for timing devices, aircraft instruments, and the like.

There is an increasing demand for miniature motors of this type, since they are useful for a wide variety of purposes. With the increasing demand for such devices, it is desirable to decrease the cost of their manufacture and at the same time provide them with a high degree of reliability and accuracy. The motor of the present invention accomplishes these results and, due to its simplicity, minimizes the assembly time of the component parts.

An alternating current electric motor made in accordance with the invention comprises a pair of opposed cylindrical field assemblies each having an array of magnetic poles spaced circumferentially around the assembly, the poles of each assembly having portions projecting lengthwise of the assembly and extending between and in spaced relation to the projecting pole portions of the other assembly. A magnetic rotor is disposed within a polar space located between the opposed field assemblies and substantially surrounded by their projecting pole portions. A non-magnetic tubular shell closely surrounds the assemblies and maintains the projecting pole portions in their properly spaced relation, preferably by means of longitudinal ridges projecting from the inner surface of the shell and lying in the gaps between these pole portions.

In the preferred construction, each field assembly includes a pair of generally cup-shaped pole pieces secured to the opposite end portions, respectively, of a hub, the legs or poles of each pole piece forming the cylindrical part of the cup and extending toward the opposing field assembly, the poles of the outer pole piece projecting between the poles of the inner pole piece on the hub. A coil is mounted on the hub within the cup-like outer pole piece, and a washer or spacer secured to the inner end of the hub has peripheral notches through which the projecting pole portions of the two pole pieces extend toward the opposing field assembly. The motor may be assembled by inserting the two field assemblies into the shell from the opposite ends thereof, until the respective spacers engage the corresponding ends of the longitudinal ridges in the shell, whereupon each projecting pole portion of each field assembly lies in a separate space between two ridges in the shell.

The new motor will now be described in greater detail in reference to the accompanying drawings, in which—

Figure 1:
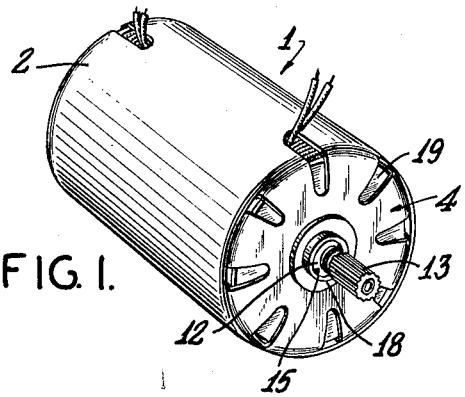
FIG. 1 is a perspective view of a complete motor embodying a preferred form of the invention.
Figure 2:
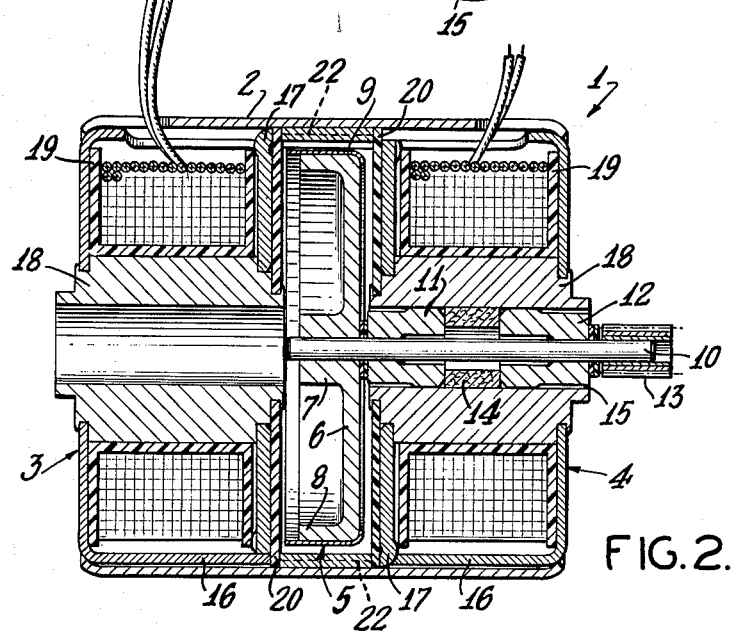
FIG. 2 is a longitudinal sectional view of the motor shown in FIG. 1.

As shown in FIGS. 1 and 2, the inner portion of the motor 1 is mounted within an aluminum shell 2. The motor comprises two essentially similar portions, a rear field assembly 3 and a forward field assembly 4. The field assemblies are physically identical except that the rotor assembly generally indicated at 5 has its shaft mounted in bearings located in only one of the field assemblies, which we have chosen to call the forward field assembly. The rotor assembly 5 includes an aluminum disc 6 having a hub 7 and the flange 8. Surrounding and integral with the flange 8 is a rim 9 of thin magnetic metal, preferably S.A.E. 1095 (high carbon) steel which is heat treated glass hard, comprising the magnetic portion of the rotor assembly. The rotor is fixed to a shaft 10 which is disposed for rotation within bearings 11 and 12 secured centrally in the forward field assembly 4. The outer end of the shaft may be equipped with a pinion 13 or other suitable means for transmission of the rotary motion. A felt collar 14 is disposed between the bearings 11—12 and is saturated with oil for lubrication purposes. The outer bearing 12 has an outer portion of reduced diameter, as shown at 15.

The field assemblies 3 and 4 will hereinafter be described in reference to FIGS. 2 through 8.

Figure 3:
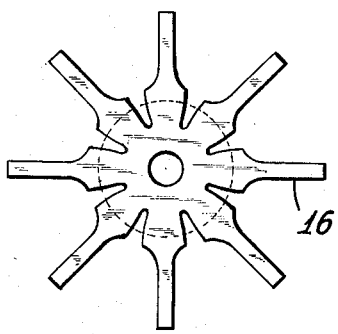
FIGS. 3 and 4 are plan views of inner and outer pole pieces, respectively, of the motor before they are bent to their final forms.
Figure 4:
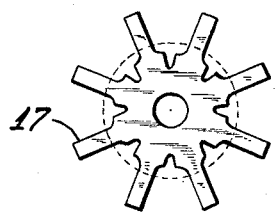
Figure 5:
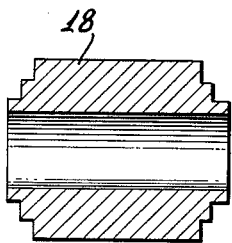
FIG. 5 is a longitudinal sectional view of the hub portion of a magnetic field assembly.
Figure 6:
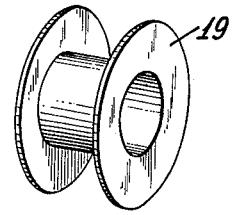
FIG. 6 is a perspective view of the coil bobbin.
Figure 7:
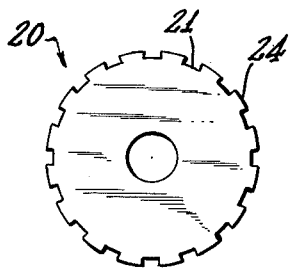
FIG. 7 is a plan view of the pole piece spacer and stop member.
Figure 8:
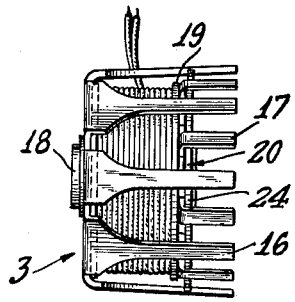
FIG. 8 is an elevation view of one of the fabricated magnetic field assemblies.

Each field assembly comprises outer and inner pole pieces 16 and 17, respectively, which, as illustrated in FIGS. 3 and 4, respectively, are punched from flat strips of magnetic material, preferably material sold under the trade name of "Hypernik" which is hydrogen annealed to 1700–2100 degrees Fahrenheit and cooled at the rate of 100 degrees per hour. Each flat pole piece 16 and 17 is formed into a cup shape around a cylindrical form having an outer periphery indicated by the dotted circle in FIGS. 3 and 4. Thus, the two pole pieces 16—17, when axially aligned, have all of their legs or poles lying substantially in a common circle, as shown in FIG. 8. The outer formed pole piece 16 is placed over the outer end of a hub 18. The projecting portion of the hub 18 is mushroomed under pressure to secure the piece to the hub. A coil bobbin 19 (FIG. 6), wound in accordance with a description to follow, is placed on the hub 18 nested within the outer pole piece. The inner pole piece 17 is next placed on the hub and followed by the spacer 20 (FIG. 7) made of suitable insulating material, such as cloth impregnated with Bakelite. The spacer 20 has peripheral cut-out portions 21 to receive each of the poles of both pole pieces, to properly orient and align the poles. The remaining end of the hub 18 is then mushroomed to unite the components into an integral assembly, as shown in FIG. 8. As shown in FIG. 8, after assembly the free ends of the pole pieces 16 and 17 do not completely lie along the circumference of the dotted circle of FIGS. 3 and 4, but are sprung outwardly a slight amount.

The field assembly 4 is physically identical to the field assembly 3 but differs in the electrical size of the coil, and its hub 18 contains the rotor shaft 10, the bearings 11 and 12, and the felt 14. The two field assemblies are inserted into the shell 2, as shown in FIG. 2, by compressing the poles of each assembly sufficiently to permit entrance into the shell. The outward pressure of the ends of the poles on the inner surface of the shell 2 maintains the assemblies in the proper operating position.

Figure 9:
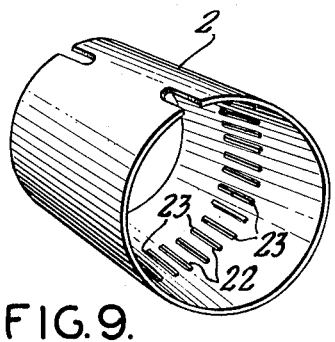
FIG. 9 is a perspective view of the interior portion of the mounting shell illustrating the central pole-aligning ridges.

An important feature of my invention is the constructional detail of the aluminum shell 2. As shown more clearly in FIG. 9, the central portion of the inner surface of the shell 2 is provided with longitudinal ridges or pole-spacing elements 22, which are milled from a thick-walled shell which may be aluminum or other suitable non-magnetic material. In the embodiment of my invention depicted, each pole piece 16 and 17 has eight poles, so that there will be a total number of 32 poles and 32 air gaps in the area immediately surrounding the rim 9 of the rotor, and thus the inner surface of the shell is provided with 32 parallel ridges 22 which serve to provide and maintain the correct air gap spacing between adjacent poles. The ridges further serve as axial stops to provide the desired longitudinal spacing between the two field assemblies 3 and 4, since the ends 23 of the ridges 22 will abut the outer edges of the projecting teeth 24 of the adjacent spacer member 20 as the field assemblies are advanced into the shell 2.

As previously mentioned, each field assembly 3—4 is inserted in one end portion of shell 2 by first pressing the free ends of the poles of the pieces 16 and 17 toward the axis of the field assembly, so that the shell can receive all of the poles of the assembly. Then the field assembly is pushed axially into the shell until the spacer teeth 24 engage the adjacent ends of the shell ridges 22. In the event that the latter ends are first engaged by the free ends of the poles of the pieces 16—17, the field assembly is rotated in the shell until the poles become aligned with the spaces between the ridges 22, which will be apparent when the field assembly can be pushed entirely into the shell as shown in FIG. 2. When both field assemblies are thus inserted, the rotor 5 will be located between the spacers 20 of the respective field assemblies and within a cage-like arrangement formed by the free end portions of the poles of the pole pieces 16 and 17 of the respective field assemblies, the poles of one assembly alternating with the poles of the other assembly so that each pole of one assembly lies between two poles of the other assembly.

In some special applications, the poles may not be distributed evenly about the rotor assembly. For example, where it is desirable to have a sinusoidal distribution of poles, the spacing between the poles would not be uniform but would progressively expand and decrease. In such a case, the internal shell ridges 22 would not be uniformly spaced but would follow the spacing of the pole design.

I have found that a motor made in accordance with the foregoing description, wherein one field assembly has a coil of 5600 turns of insulated #44 copper wire and the other field assembly has a coil of 3400 turns of #41 insulated wire, will operate satisfactorily when the smaller winding is serially connected to a capacitor of 0.02 microfarad and that combination is connected in parallel with the larger coil to a source of 115 volts of 400 cycle alternating current. It will be obvious to those versed in the art that the wire size and number of turns may be varied as desired to adapt this structure for operation on different voltages, currents, or frequencies.

We claim:

1. An electric motor comprising a pair of opposed cylindrical magnetic field assemblies, each of said assemblies including an axial hub, a pair of pole pieces secured to opposite end portions respectively of the hub, each pole piece being in the general shape of a cup and having poles forming the cylindrical portion of the cup and projecting from the base of the cup toward the opposing field assembly, and a coil mounted on the hub and located within one of the cup-shaped pole pieces, the projecting poles of each assembly extending between and in spaced relation to the projecting poles of the other assembly and defining a polar space between the assemblies, a magnetic rotor disposed for rotation within said polar space, a non-magnetic tubular shell closely surrounding both field assemblies and bearing against the poles thereof, and non-magnetic spacer means including teeth disposed between adjacent poles of the assemblies to maintain magnetic gaps between said assemblies.

2. A motor according to claim 1, in which said spacer means include discs secured to the hubs of the respective assemblies and carrying said teeth, the disc of at least one assembly having its teeth in abutment with the ends of the projecting poles of the other assembly, thereby providing axial magnetic gaps to prevent the ends of the poles of one assembly from magnetically contacting the pole pieces of the opposing assembly.

3. A motor according to claim 1, in which said teeth are formed by longitudinal ridges on the inner surface of the shell and provide angular magnetic gaps to prevent the edges of the poles of one assembly from magnetically contacting the edges of the poles of the opposing assembly.

4. An electric motor comprising a pair of opposed cylindrical magnetic field assemblies, each of said assemblies including an axial hub, a pair of pole pieces secured to opposite end portions respectively of the hub, each pole piece being in the general shape of a cup and having poles forming the cylindrical portion of the cup and projecting from the base of the cup toward the opposing field assembly, and a coil mounted on the hub and located within one of the cup-shaped pole pieces, the projecting poles of each assembly extending between and in spaced relation to the projecting poles of the other assembly and defining a polar space between the assemblies, a magnetic rotor disposed for rotation within said polar space, a non-magnetic tubular shell closely surrounding both field assemblies and bearing against the poles thereof, and non-magnetic spacer elements to provide magnetic gaps between said assemblies, said spacer elements being toothed discs each secured to the end of the hub of a field assembly adjacent the rotor, the teeth of each disc extending into the spaces between adjacent poles of the corresponding assembly, whereby the poles of each assembly are maintained apart from the pole pieces of its opposing assembly.

5. An electric motor comprising a pair of opposed cylindrical magnetic field assemblies, each of said assemblies including an axial hub, a pair of pole pieces secured to opposite end portions respectively of the hub, each pole piece being in the general shape of a cup and having poles forming the cylindrical portion of the cup and projecting from the base of the cup toward the opposing field assembly, and a coil mounted on the hub and located within one of the cup-shaped pole pieces, the projecting poles of each assembly extending between and in spaced relation to the projecting poles of the other assembly and defining a polar space between the assemblies, a magnetic rotor disposed for rotation within said polar space, a non-magnetic tubular shell closely surrounding both field assemblies and bearing against the poles thereof, and non-magnetic spacer elements to provide magnetic gaps between said assemblies, said spacer elements being longitudinal ridges disposed on the inner surface of the shell, the thickness of said ridges defining magnetic gaps between edges of adjacent poles of the two field assemblies.

6. A motor according to claim 5, in which the length of said ridges defines magnetic gaps between the ends of the poles of one of said field assemblies and the nearer pole piece of the opposing assembly.

7. A motor according to claim 4, in which said spacer elements also include longitudinal ridges disposed on the inner surface of the shell between adjacent poles of the two assemblies, whereby axial and angular pole spacing is maintained simultaneously.

References Cited in the file of this patent

UNITED STATES PATENTS

| | | |
|---|---|---|
| 2,070,447 | Morrill | Feb. 9, 1937 |
| 2,122,307 | Welch | June 28, 1938 |

FOREIGN PATENTS

| | | |
|---|---|---|
| 477,835 | Great Britain | Jan. 3, 1938 |
| 1,021,943 | Germany | Jan. 2, 1958 |